United States Patent [19]

Behringer et al.

[11] Patent Number: 4,591,529

[45] Date of Patent: May 27, 1986

[54] SHEET FOR LAMINATED IRON CORES INCLUDING WOVEN OR NON-WOVEN FABRICS

[75] Inventors: Jürgen Behringer; Hans-Friedrich Pluciniczak; Wolfgang Syllwasschy, all of Bochum, Fed. Rep. of Germany; Franz Loley, Vienna, Austria

[73] Assignee: Stahlwerke Bochum AG, Bochum, Fed. Rep. of Germany

[21] Appl. No.: 650,385

[22] Filed: Sep. 13, 1984

[30] Foreign Application Priority Data

Sep. 14, 1983 [DE] Fed. Rep. of Germany ....... 3333155

[51] Int. Cl.⁴ .......................... B32B 7/00; B32B 15/00
[52] U.S. Cl. .................................. 428/252; 428/285; 428/287; 428/344; 428/346; 428/354
[58] Field of Search ............... 428/252, 285, 287, 344, 428/346, 354

[56] References Cited

U.S. PATENT DOCUMENTS 4,323,620  4/1982  Iwabuchi et al. .................. 428/285

Primary Examiner—Marion E. McCamish
Attorney, Agent, or Firm—Sprung Horn Kramer & Woods

[57] ABSTRACT

A sheet, especially an electric sheet for manufacturing laminated iron cores for generators, motors, transformers, etc. and covered on one or both sides with a thin layer consisting of an adhesive applied as a liquid to the sheet and then dried and of a filler. The sheet has as a filler on one or both sides a recticular skeletal support that is at least partly anchored with the layer of adhesive and that consists of a fibrous material that accommodates the adhesive. A woven or non-woven fabric, preferably of polyester fibers, can be used as a support.

8 Claims, 2 Drawing Figures

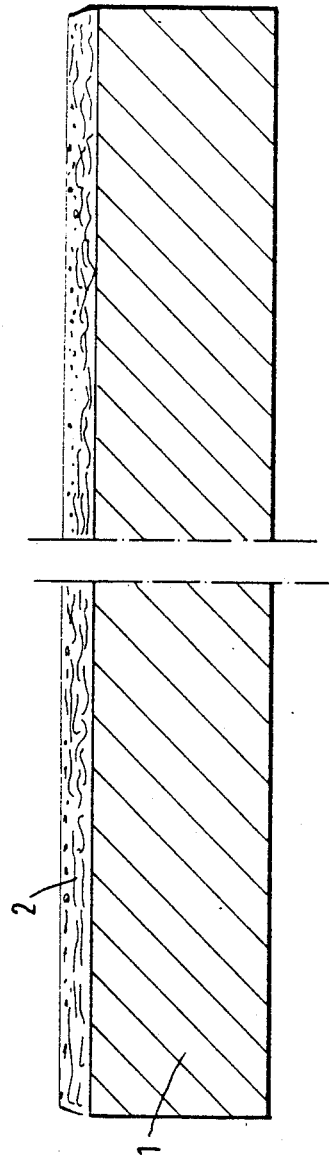
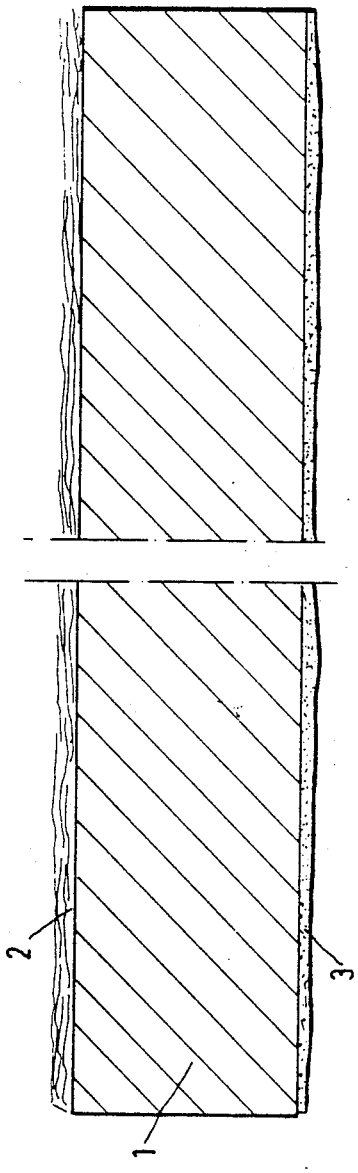

SHEET FOR LAMINATED IRON CORES INCLUDING WOVEN OR NON-WOVEN FABRICS

BACKGROUND OF THE INVENTION

1. Field of the Invention

The object of the invention is a sheet, especially an electric sheet for manufacturing laminated iron cores for generators, motors, transformers, etc. and covered on one or both sides with a thin layer consisting of an adhesive applied as a liquid to the sheet and then dried and of a filler.

2. Discussion of the Prior Art

In manufacturing laminated iron cores, the sheets are stacked one on top of another, separated by a coating to decrease eddy-current losses, and are usually already coated on one or both sides. The coating can be for example a lacquer, specifically a hardened plastic-resin lacquer, or an inorganic phosphate coating, something called a bonder layer. Since it is basically attempted in this method of manufacturing laminated iron cores to provide the laminated package with as high a stacking factor (volume of iron per volume of package) as possible, the coating between the sheets must be as thin as possible. The stacked sheets are then fastened together, by riveting or welding for example, to secure the package against the mechanical stress that results in practice from the dynamic oscillations produced by alternating magnetic fields.

To secure the laminated package against mechanical stress without, however, riveting or welding the stacked sheets together, coating the sheets ahead of time on one or both sides with adhesive, specifically with a hardening adhesive applied in a liquid film to the surfaces to be bonded together, is known. The adhesive can be preliminarily dried at low temperatures (room temperature to about 150° C.), in which state it is not adhesive. The preliminarily dried adhesive can be subjected to higher temperatures to resoften it (plastomeric state) and then duroplastically hardened under pressure at the higher temperature, ranging from 130° to 250° C. Subsequent to cooling to room temperature while maintaining the pressure, the adhesive will develop full adhesion.

Since the preliminarily dried layer of adhesive is non-adhesive at room temperature, the material, which is in the form of a strip, can be coated and preliminarily dried before it is wound into coils and supplied for final manufacture of the iron cores, at which time the particular sheets selected for the laminated package are stamped out of the strip of material and collected into stacks. Subsequent compression of the sheets or package under high pressure and simultaneous heating to hardening temperature following the softening and hardening of the adhesive applied to one or both sides of the sheet leads to adhesion. The hardening temperature is usually higher than the temperature at which the adhesive, applied as a liquid, has been dried. Experience has shown that hardening time is also a determining factor. Subsequent to hardening, the package is cooled to room temperature while the pressure is maintained.

When the sheets are coated exclusively with adhesive, tests have demonstrated a drawback in that it is impossible to always prevent metallic contact between the sheets in the laminated package because the coating gets softer as temperature increases during the compression and simultaneous melting and hardening of the adhesive and is accordingly forced away from any elevated points on the surface of the sheet. In the adhering state, this leads not only to increased eddy-current losses but also deleteriously affects the reliability with which the adhesive adheres. Surface irregularities that can force the adhesive away or out include deviations in shape or thickness, warping, surface defects like pimples and scratches, the stamping burr, and even the roughness of the sheet itself. Problems have developed in particular in fastening larger packages together, in assembling cores for transformers or stator packages for generators, for example.

Another drawback to sheets that are coated strictly with the adhesive, preliminarily dried, and assembled into a laminated package is that the adhesive, which escapes at the side and dries while it is being compressed, must be subsequently removed mechanically at considerable expense. Although this can be taken care of by grinding, the resulting metal burr must then be removed in an additional step. Attempts to prevent the adhesive from escaping by applying the pressure instantaneously have not been successful because the quality of the adhesive bond depends also to a considerable extent on the length of time the pressure is applied. Furthermore, final-annealed electric sheets are sensitive to impacts and jolts, the more so the higher their quality. The instantaneous application of pressure when compressing the sheets can, accordingly, not be utilized to prevent the adhesive from escaping out of the package.

Improving the magnetic properties of laminated iron cores made out of single sheets for transformers, motors, generators, and similar devices by coating both sides not with adhesive alone but with a mixture of adhesive and filler that is subsequently dried is already known from U.S. Pat. No. 3,029,403. The filler consists of a number solid, spherical, electrically non-conductive particles. The particles are preferably spherical glass beads with a uniform diameter of about 25 $\mu$m. The sheets coated with this mixture are stacked into a laminated package and fastened together by compressing the sheets or package under pressure and simultaneous heating.

As tests of this known method demonstrate, however, the aforesaid drawbacks and problems deriving from warping, surface defects and even the roughness of the surface of the sheet cannot be overcome with this process. It has been demonstrated that the sheets in the finished laminated packages will still come into metallic contact. Furthermore, the embedding of spherical particles in the adhesive does not prevent it from escaping at the sides while the sheets are being compressed subject to pressure. Also, tests have demonstrated that it is especially difficult to obtain and in particular to preserve a homogeneous mixture of the adhesive and spherical particles not only while the coated and preliminarily dried sheets are being manufactured, but, even more so, during the subsequent fastening together of the sheets into a package. The spherical, freely moving particles can wander through the layer of adhesive and avoid the irregularities, e.g. the peaks of roughness for example, in the surface of the sheet not only in the liquid phase of the adhesive while it is being applied to the sheets, but also in the thermoplastic phase during compression and adhesion.

This essential drawback of the known method has only been reliably eliminated by keeping the diameter of the spherical solid particles essentially longer than any conceivable surface irregularities. This, however, results in an unsatisfactory stacking factor and a large and undesirable interval between the individual sheets in the laminated package.

It has in general been demonstrated that it is impossible to avoid double coating in manufacturing laminated iron cores by fastening together stacked sheets of an especially large surface area—supporting-magnet sheets for longitudinal stator drive mechanisms in magnetic levitation, stator and rotar end sheets for large electrical machines, or yoke sheets for large-scale transformers, for example—if the eddy-current losses are to be reduced to the necessary level. In double coating, the sheets are first coated on one or both sides with a conventional electric-sheet coating like a hardened artificial-resin lacquer or bonder layer. The adhesive is then applied in liquid form to this layer and dried. Of potential double coatings, only hardened artificial-resin lacquer in combination with an adhesive applied thereto has led to satisfactory results with respect to the desired decrease in eddy-current losses. Aside from the essentially higher costs of double coating, the essential drawback of this process is that it can generally only be carried out in two separate stages. This is also true, for example, when one side of the strip of material or sheet is provided only with the adhesive and the other side with a conventional electric-sheet coating.

Another potential drawback of double coating derives from the unsatisfactory adhesion of the adhesive to the conventional electric-sheet coating. The result is that qualitative trade-offs in the adhesion of the sheets to each other must absolutely be taken into account. Again, these drawbacks can only be compensated for to some extent by adding even more expensive adhesion promoters.

The object of the present invention is to provide a sheet that is coated on one or both sides with a preliminarily dried adhesive and that can be employed to manufacture laminated iron cores with no metallic contact between the sheets even when there are surface irregularities without reducing the requisite reliability of adhesion and without any of the adhesive escaping laterally out of the package while the sheets are being compressed under pressure.

SUMMARY OF THE INVENTION

This object is attained in accordance with the invention in a sheet of the aforesaid type that has as a filler on one or both sides a reticular skeletal support that is at least partly anchored with the layer of adhesive and that consists of a fibrous material that accommodates the adhesive.

The skeletal support that is anchored with the layer of adhesive can in a practical way be elastically tensioned within the layer of adhesive once the layer has been preliminarily dried, meaning that the fibers in the skeletal support are subject to tensile stress.

At least partly anchoring the skeletal support with the adhesive in accordance with the invention retains the adhesive in place even while the sheets are being fastened together into a laminated package and prevents it from flowing or escaping laterally out of the package. The reticulated structure of the individual fibers in the support prevents them from being forced away by surface irregularities in the sheets and eliminates metallic contact between the sheets in the package.

If the skeletal support comprises, in practice, elastic fibers, the minimal obtainable layer thickness between the sheets in the laminated package is not determined as in U.S. Pat. No. 3,029,403 by the diameter of spherical particles or by how thick the fibers are, but results from their elasticity or ductility while the sheets are being compressed into a package, accompanied by the application of heat. Thus, stacking factors that are approximately as desirable as those obtained with sheets coated exclusively with adhesive, assembled into a package, and fastened together with adhesive can be obtained when the skeletal support consisting of elastic fiber alone is, as is preferable, about 5 to 15 $\mu$m thick. The preliminarily dried coating that consists in accordance with the invention of the skeletal support and adhesive is preferably less than 30 $\mu$m thick, especially in the range of 7 to 20 $\mu$m thick.

The skeletal support can be unwound in the form of webs or strips from a supply reel and applied to the metal strip or sheet. The sheet can accordingly be coated in only one operation in such a way that the lamellae that are subsequently stamped out of it and assembled into a package can also be fastened together with adhesive in only one operation and can be present in the finished laminated package at a predetermined distance apart with a high level of strength.

The band that the sheets are later cut from can, for instance, first be coated with the adhesive in liquid form and the web of fibers unwound from the reel applied to the still wet adhesive to form the skeletal support in the layer of adhesive as it is subsequently dried at up to about 150° C. in the drying furnace for the ultimate fastening together with adhesive of the laminated iron cores subject to pressure and temperature. It has been discovered that the adhesion of the preliminarily dried fiber-support layer of adhesive to the sheet can be increased perceptibly, by about 1½ fold if the coating is applied not to a cold strip of metal but to a strip preliminarily heated to or still just below drying temperature.

Appropriate adhesives include two-stage metal adhesives that dry physically during preliminary drying and harden under pressure at elevated temperature, especially a polyester urethane modified with a phenolic resin (the reaction product of a phenolic-resin modified polyester and a di- or polyisocyanate) or an epoxide-resin system catalyzed with boron trifluoride. It is an advantage to combine these adhesives in particular with a skeletal support that comprises polyester fibers, is a woven or non-woven fabric, is in the form of a strip, consists of 10 to 40% untreated, partly stretched fibers for binding fibers and of 60 to 90% treated, mechanically stretched fibers, and has fibers that are dumbbell-shaped and thermally consolidated in a predominately stretched-out array or in a random arrangement.

It has on the whole been demonstrated that double coating is unnecessary in manufacturing laminated iron cores with sheets that are to be fastened together with adhesive even when the laminated packages are large. The aforementioned drawbacks of that known method do not occur in sheets provided with a coating in accordance with the invention. Furthermore, the aforesaid drawbacks of sheets coated with adhesive alone can also be overcome by employing the coating in accordance with the invention.

The overall advantages of fastening sheets together with the coating in accordance with the invention are that a defined distance is maintained between the sheets or lamella, surface irregularities resulting from shape defects and roughness will not penetrate at the pressure and temperature ranges of the packaging machine and metallic contact will be eliminated even given the presence of surface damage like dents, blisters, or scratches, the coating will accommodate stamping burr better while the packages are being compressed, no adhesive will escape during compression, and the fastened-together lamellae will mechanically adhere more securely.

It has surprisingly been discovered that packages fastened together from sheets in accordance with the invention exhibit satisfactory damping properties when subjected to long-term vibration of the type that occurs in practice as the result of alternating magnetic fields or dynamic stress and accordingly provide additional security for specific applications. This behavior provides an indication of the dependence of the damping properties of the fastened-together package on the elastic properties of the fiber employed as a skeletal support for the adhesive joint.

It has been discovered that cellulose fibers, glass fibers, slag wool, and especially polyester fibers in the form of individual fibers, a woven fabric, or in particular of a non-woven fabric can be employed as a skeletal support. Especially appropriate is a non-woven polyester fabric with a low weight per unit of area in order to keep the layer between sheets thin and hence make it possible to adjust the usual filling factors. The method in accordance with the invention make it possible to attain layer thicknesses of less than 20 $\mu$m subsequent to compression.

Individual fibers can also be added directly to the adhesive by sprinkling, electrostatic flocking, or spraying, for example.

It has been demonstrated that the skeletal support of the coating in accordance with the invention increases the strength of the adhesive bond without affecting the capacity of the adhesive to adhere. Experience indicates that this is especially true when acetanilide is added to the adhesive as an adhesion promoter. It at least equals the adhesive capacity of adhesive between sheets coated only with preliminarily dried adhesive to a depth of approximately 5 $\mu$m.

It has also been demonstrated that the supporting action of the fibrous skeletal support in accordance with the invention and its effect on the strength of the adhesive bond are especially powerful when the support is a combination of fibers employing 10 to 40%, preferably 20 to 30%, untreated, partly stretched binder fibers and 60 to 90%, preferably 70 to 80% polyester fibers that have been treated subsequent to spinning and mechanically stretched. This is especially true when the fibers are dumbbell-shaped to promote hooking or reticulation and are thermally consolidated either in a predominately stretched-out array or in a random arrangement.

To say that the fibers are dumbbell-shaped means that the individual fibers are thickened at each end, e.g. bone shaped. An array in which 70 to 80% of the fibers are parallel and 20 to 30% are at an angle of 20° to 30° to the preferred orientation is practical.

The invention will now be described with reference to three examples which make reference to the accompanying drawings in which:

FIG. 1 is a cross sectional elevation showing a metallic sheet (1) to which has been applied an adhesive coating (2) and a fabric, in uncompressed state.

FIG. 2 is a view similar to FIG. 1 showing a metallic sheet (1) to which has been applied an adhesive coating (2)(3) on both sides and a fabric on the upper side containing adhesive coating (2).

EXAMPLE 1

Cold-rolled electric sheet, 0.5 mm thick and with a magnetic loss $P_{1.0}$ of 1.7 W/kg as determined in accordance with DIN 46400 is coated on one side with an adhesive based on polyvinyl butyral, polyester with OH groups, and phenolic resin with a latent hardener, specifically a phenol-capped tri-isocyanate in a rubber-roller coating machine. The adhesive has a solids content of 21% and a viscosity of 130 s as determined in accordance with 4-DIN 52211. The wet-film thickness is 25 to 30 $\mu$m. A thermally consolidated non-woven polyester fabric with a random fiber distribution and a weight per unit of area of 12 g/m$^2$ (equal to or more than about 30 $\mu$m) as determined in accordance with DIN 53854 is continuously embedded into the wet film from a supply reel. Another layer of adhesive is rolled on thick enough to ensure complete saturation of the fabric from the upper surface down (see FIG. 1). The coated sheet is dried in a continuous drying furnace for 1 minute at 150° C. The layer is about 12 to 14 $\mu$m thick after drying. The sheets are cut into strips measuring 30$\times$100 mm and stacked. The resulting laminated packages are compressed at a pressure of 300 N/cm$^2$ and a temperature of 210° C. for about 120 minutes (heated up for 105 minutes and maintained at constant temperature for 15 minutes).

EXAMPLE 2

Cold-rolled electric sheet, 0.65 mm thick and with a magnetic loss $P_{1.0}$ of 2.6 W/kg as determined in accordance with DIN 46400 is coated on two sides with an adhesive based on epoxide resin with a latent hardener consisting of a boron trifluoride complex. The adhesive has a solids content of 40% and a viscosity of 100 s as determined in accordance with 4-DIN 52211. The wet-film thickness is 20 $\mu$m. A thermally consolidated non-woven polyester fabric with a longitudinal fiber distribution and a weight per unit of area of 9 g/m$^2$ (equal to or more than about 22 $\mu$m) as determined in accordance with DIN 53854 is continuously embedded from a supply reel into the adhesive on the upper surface of the sheet. The resulting layer is dried for 50 s at 140° C. in a continuous hot-air suspension drier. The coating (including skeletal support) on the top of the sheet is about 14 $\mu$m thick and that on the bottom about 8 $\mu$m thick (see FIG. 2). The sheet with the preliminarily dried coatings can be stacked and stored at temperatures below 60° C. and will not stick together during storage.

EXAMPLE 3

Cold-rolled electric sheet, 0.5 mm thick and with a magnetic loss $P_{1.0}$ of 3.6 W/kg as determined in accordance with DIN 46400 is coated as described in Example 1. 0.5% acetanalide per volume of the wet adhesive is added to it to promote adhesion. The wet-film thickness is 25 to 30 $\mu$m. A thermally consolidated non-woven polyester fabric with a cross-layed longitudinal fiber distribution and a weight per unit of area of 12 g/m$^2$ (equal to or more than about 30 $\mu$m), as determined in accordance with DIN 53854, is embedded into the wet film. Drying and processing are as described with reference to Example 1.

What is claimed is:

1. In a sheet, especially an electric sheet for manufacturing laiminated iron cores for generators, motors, transformers, etc. and covered on one or both sides with a thin layer consisting of a two-stage hardening metal adhesive applied as a liquid to the sheet and then preliminarily dried at low temperatures and hardened under pressure at higher temperatures in the range from 130°–250° C., the improvement wherein the sheet has a filler on one or both sides comprising reticular skeletal support including a fibrous woven or non-woven fabric which accommodates the adhesive as a liquid and that is at least partly anchored with said thin layer of said preliminarily dried adhesive.

2. A sheet according to claim 1 wherein the skeletal support applied to the sheet comprises of elastic fibers.

3. A sheet according to claim 1 wherein the skeletal support applied to the sheet comprises of polyester fibers.

4. A sheet according to claim 1 wherein the skeletal support applied to the sheet is in the form of a strip.

5. A sheet according to claim 1 wherein the fabric applied to the sheet comprises 10 to 40% untreated, partly stretched fibers for binding fibers and 60 to 90% treated, mechanically stretched fibers.

6. A sheet according to claim 1 wherein the non-woven fabric applied to the sheet has fibers that are dumbbell-shaped and thermally consolidated in a predominately stretched-out array or are in a random arrangement.

7. A sheet according to claim 1 wherein 0.01 to 2.0% by weight of acetanilide is added to the adhesive as an adhesion promoter.

8. A sheet according to claim 1 wherein both the fabric applied to the sheet and the preliminarily dried adhesive together having a coating thickness of 30 $\mu$m or less and preferably of 20 $\mu$m or less.

* * * * *